US009606822B2

(12) United States Patent
Hunt et al.

(10) Patent No.: US 9,606,822 B2
(45) Date of Patent: Mar. 28, 2017

(54) LIGHTWEIGHT ON-DEMAND VIRTUAL MACHINES

(75) Inventors: Galen C. Hunt, Bellevue, WA (US); Reuben R. Olinsky, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1019 days.

(21) Appl. No.: 13/331,078

(22) Filed: Dec. 20, 2011

(65) Prior Publication Data

US 2012/0227038 A1 Sep. 6, 2012

Related U.S. Application Data

(60) Provisional application No. 61/449,072, filed on Mar. 3, 2011.

(51) Int. Cl.
*G06F 9/455* (2006.01)
*G06F 9/44* (2006.01)

(52) U.S. Cl.
CPC ............ *G06F 9/45558* (2013.01); *G06F 8/71* (2013.01); *G06F 2009/45575* (2013.01)

(58) Field of Classification Search
None
See application file for complete search history.

(56) References Cited

U.S. PATENT DOCUMENTS

| 7,334,122 B2 | 2/2008 | Burokas et al. |
| 7,937,612 B1 | 5/2011 | Lyadvinsky et al. |
| 2007/0061556 A1 | 3/2007 | Rothman et al. |
| 2008/0127348 A1* | 5/2008 | Largman ................. G06F 21/56 726/24 |
| 2010/0083015 A1* | 4/2010 | Yokota et al. ................ 713/310 |
| 2010/0115334 A1 | 5/2010 | Malleck et al. |
| 2010/0262853 A1 | 10/2010 | Goda |

OTHER PUBLICATIONS

Mergen et al. ("Virtualization for High-Performance Computing"; ACM SIGOPS Operating Systems Review; vol. 40, Issue 2, Apr. 2006, pp. 8-11).*
Ammons, et al., "Libra: A Library Operating System for a JVM in a Virtualized Execution Environment", Proceedings of the 3rd international conference on Virtual execution environments (VEE), Jun. 13-15, 2007, pp. 11.
(Continued)

*Primary Examiner* — Eric C Wai
(74) *Attorney, Agent, or Firm* — David Chin; Chin IP, PLLC

(57) ABSTRACT

Virtual machines are made lightweight by substituting a library operating system for a full-fledged operating system. Consequently, physical machines can include substantially more virtual machines than otherwise possible. Moreover, a hibernation technique can be employed with respect to lightweight virtual machines to further increase the capacity of physical machines. More specifically, virtual machines can be loaded onto physical machines on-demand and removed from physical machines to make computational resources available as needed. Still further yet, since the virtual machines are lightweight, they can be hibernated and restored at a rate substantially imperceptible to users.

20 Claims, 7 Drawing Sheets

(56) References Cited

OTHER PUBLICATIONS

Vaughan-Nichols, Steven J., "New Approach to Virtualization is a Lightweight", IEEE, Computer, vol. 39, Issue 11, Nov. 2006, pp. 12-14.
Kobayashi, et al., "Quick Reboot-based Recovery for Commodity Operating Systems in Virtualized Server Consolidation", Retrieved Date: Sep. 15, 2011, pp. 6.
Engler, et al., "Exokernel: An Operating System Architecture for Application-Level Resource Management", Proceedings of the fifteenth ACM symposium on Operating systems principles (SOSP), Dec. 1995, pp. 1-16.
"Amazon Elastic Compute Cloud (EC2)", Retrieved at <<http://aws.amazon.com/ec2/>>, 2006, pp. 22.
Ammons, et al., "Libra: A Library Operating System for a JVM in a Virtualized Execution Environment", International Conference on Virtual Execution Environments (Co-Located with FCRC 2007 Conference), Jun. 13-15, 2007, pp. 11.
Anderson, Thomas E., "The Case for Application-Specific Operating Systems", Third Workshop on Workstation Operating Systems, Apr. 23-24, 1992, pp. 92-93.
Appavoo, et al., "Providing a Linux API on the Scalable K42 Kernel", Proceedings of the FREENIX Track: USENIX Annual Technical Conference, Jun. 9-14, 2003, pp. 14.
Barham, et al., "Xen and the Art of Virtualization", Proceedings of the nineteenth ACM symposium on Operating sysems principles, Oct. 19-22, 2003, pp. 14.
Baumann, et al., "The Multikernel: A New OS Architecture for Scalable Multicore Systems", Proceedings of the ACM SIGOPS 22nd symposium on Operating systems principles, Oct. 11-14, 2009, pp. 1-20.
Bhattiprolu, et al., "Virtual Servers and Checkpoint/Restart in Mainstream Linux", ACM SIGOPS Operating Systems Review—Research and developments in the Linux kernel, vol. 42, No. 5, Jul. 2008, pp. 104-113.
Bugnion, et al., "Disco: Running Commodity Operating Systems on Scalable Multiprocessors", ACM Transactions on Computer Systems, vol. 15, No. 4, Nov. 1997, pp. 412-447.
Chen, et al., "Setuid Demystified", In Proceedings of the 11th USENIX Security Symposium, USENIX Association, 2002, pp. 20.
Cheriton, et al., "A Caching Model of Operating System Kernel Functionality", In Proceedings of the 1st USENIX Symposium on Operation Systems Design and Implementation, Nov. 1994, pp. 15.
Douceur, et al., "Leveraging Legacy Code to Deploy Desktop Applications on the Web", Proceedings of the 8th USENIX conference on Operation systems design and implementation, 2008, pp. 16.
Eiraku, et al., "Fast Networking with Socket-Outsourcing in Hosted Virtual Machine Environments", Proceedings of the 2009 ACM Symposium on Applied Computing (SAC), Mar. 9-12, 2009, pp. 8.
Engler, et al., "Exokernel: An Operating System Architecture for Application-Level Resource Management", Proceedings of the fifteenth ACM symposium on Operating systems principles, Dec. 3-6, 1995, pp. 1-17.
Franke, et al., "Fuss, Futexes and Furwocks: Fast Userlevel Locking in Linux", In Proceedings of the Ottawa Linux Symposium, 2002, pp. 479-497.
Garfinkel, Tal., "Traps and Pitfalls: Practical Problems in System Call Interposition based Security Tools", In Proceedings of the Network and Distributed Systems Security Symposium, 2003, pp. 14.
Malan, et al., "DOS as a Mach 3.0 Application", Proceedings of the Usenix Mach Symposium, Nov. 1991, pp. 27-40.

Gupta, et al., "Difference Engine: Harnessing Memory Redundancy in Virtual Machines", In Proceedings of the 8th USENIX Symposium on Operating Systems Design and Implementation, 2008, pp. 14.
Helander, Johannes., "Unix under Mach: The LITES Server", Helsinki University of Technology, 1994, pp. 71.
Howell, et al., "Living Dangerously: A Survey of Software Download Practices", MSR-TR-2010-51, Microsoft Research, 2010, pp. 16.
"Escaping from Microsoft's Protected Mode Internet Explorer—Evaluating a Potential Security Boundary", White Paper, 2010, pp. 8.
Leslie, et al., "The Design and Implementation of an Operating System to Support Distributed Multimedia Applications", IEEE Journal on Selected Areas in Communications, vol. 14, No. 7, Sep. 1996, pp. 1280-1297.
Litzkow, et al., "Checkpoint and Migration of UNIX Processes in the Condor Distributed Processing System", Technical Report 1346, Apr. 1997, pp. 9.
Loscocco, et al., "Integrating Flexible Support for Security Policies into the Linux Operating System", Proceedings of the FREENIX Track: 2001 USENIX Annual Technical Conference, Jun. 25-30, 2001, pp. 1-62.
Love, Robert., "Get on the D-BUS", Linux Journal, 2005, pp. 5.
"Internet Information Services 7.5", aspx>>, Mar. 24, 2009, pp. 4.
"Microsoft Application Virtualization (App-V)", 2006, pp. 2.
"Performance Tuning Guidelines for Windows Server 2008 R2", Feb. 28, 2011, pp. 119.
"Remote Desktop Protocol: Basic Connectivity and Graphics Remoting Specification", 2010, pp. 1-421.
Tucker, et al., "Solaris Zones: Operating System Support for Server Consolidation", Proceedings of the 3rd Virtual Machine Research and Technology Symposium, May 6-7, 2004, pp. 2.
Roscoe, et al., "Hype and Virtue", Proceedings of the 11th USENIX workshop on Hot topics in operating systems, 2007, pp. 6.
Sapuntzakis, et al., "Virtual Appliances for Deploying and Maintaining Software", Proceedings of the 17th Conference on Systems Administration (LISA), Oct. 26-31, 2003, pp. 15.
Soltesz, et al., "Container-based Operating System Virtualization: A Scalable, High-Performance Alternative to Hypervisors", Proceedings of the 2nd ACM SIGOPS/EuroSys European Conference on Computer Systems, Mar. 21-23, 2007, pp. 13.
Spear, et al., "Solving the Starting Problem: Device Drivers as Self-Describing Artifacts", Proceedings of the 1st ACM SIGOPS/EuroSys European Conference on Computer Systems, Apr. 18-21, 2006, pp. 45-58.
Sugerman, et al., "Virtualizing I/O Devices on VMware Workstation's Hosted Virtual Machine Monitor", Proceedings of the General Track: 2002 USENIX Annual Technical Conference, 2001, pp. 14.
Charles., "Mark Russinovich: Inside Windows 7", Jan. 14, 2009, pp. 12.
"VMWare ThinApp.", 2008, pp. 2.
Waldspurger, Carl A., "Memory Resource Management in VMware ESX Server", ACM SIGOPS Operating Systems Review—OSDI '02: Proceedings of the 5th symposium on Operating systems design and implementation, vol. 36, No. SI, Dec. 2002, pp. 1-14.
Whitaker, et al., "Scale and Performance in the Denali Isolation Kernel", Proceedings of the 5th Symposium on Operating Systems Design and Implementation, Dec. 9-11, 2002, pp. 16.
Yee, et al., "Native Client: A Sandbox for Portable, Untrusted x86 Native Code", 30th IEEE Symposium on Security and Privacy, May 17-20, 2009, pp. 1-15.
Zeldovich, et al., "Making Information Flow Explicit in HiStar", 7th Symposium on Operating Systems Design and Implementation (OSDI'06), Nov. 6-8, 2006, pp. 263-278.

\* cited by examiner

LIGHTWEIGHT ON-DEMAND VIRTUAL MACHINES

CROSS-REFERENCE TO RELATED APPLICATIONS

This application claims the benefit of U.S. Provisional Application No. 61/449,072, filed Mar. 3, 2011, and entitled "LIBRARY-OPERATING-SYSTEM PACKAGING-MODEL SCENARIOS," and is incorporated in its entirety herein by reference.

BACKGROUND

The client-server model of computing is pervasive and forms the basis for the Internet, the World-Wide Web (or simply the web), and cloud computing. A server is a computer program that serves requests of other programs, or clients. Client requests and server responses to those requests are communicated over a network such as the Internet. Further, various types of servers exist for addressing specific tasks including a web server that hosts web pages, and a database server that enables data storage, analysis and manipulation, among others.

For providers of physical hardware, such as servers, it is desirous to run applications for multiple tenants on the same physical hardware without compromising security. Virtual machines are utilized for this purpose. A physical machine comprises various computer hardware (e.g., central processing unit, memory, storage . . . ), an operating system, and an application implementing some particular functionality. A virtual machine is a software implementation of a physical machine that operates and appears to clients has if it is a physical machine. Similar to a physical machine, a virtual machine includes a full-fledged operating system (a.k.a., guest operating system) as well as some application. However, a virtual machine includes virtualized hardware (e.g., virtual CPU, virtual memory, virtual hard disk . . . ) over which the operating system and application operate. Each tenant is given their own virtual machine, which is isolated from other virtual machines. For example, a first tenant can run a web server inside a one virtual machine and a second tenant can run a database server inside a second virtual machine.

A library approach to operating system (OS) construction was championed by several operating system designs in the 1990s. The idea of the library OS is that the entire personality of the OS on which an application depends runs in its address space as a library. An OS personality is the implementation of the OS's application programming interfaces (APIs) and application visible semantics—the OS services upon which applications are built. Early proponents of the library OS approach argued primarily that the library OS could enable better performance through per-application customization. For example, a disk-I/O bound application with idiosyncratic file access patterns can realize better performance by using a custom file-system storage stack rather than using default sequential prefetching heuristics.

Like many of its contemporaries, the library OS approach is largely forgotten, a casualty of the rise of the modern virtual machines. While most new OS designs of the time, including library OS design, run only a handful of custom applications on small research prototypes, virtual machine systems proliferated because they could run major applications by reusing existing feature-rich operating systems. The performance benefits offered by library OS designs did not overcome the need for legacy compatibility.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to lightweight on-demand virtual machines. A conventional virtual machine can be made lightweight by at least substituting a library operating system for a full-fledged operating system. Consequently, substantially more virtual machines can be run on a single physical machine than is otherwise possible. Moreover, hibernation techniques can be employed to allow vastly more virtual machines to be run on a single physical machine. Virtual machines can be added and removed from a physical machine on an as-needed, or on-demand, basis. Stated differently, virtual machines can be hibernated, or dehydrated, and resumed from hibernation, or rehydrated. Still further yet, utilization of lightweight virtual machines enables virtual machines to be hibernated and resumed from hibernation expeditiously.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
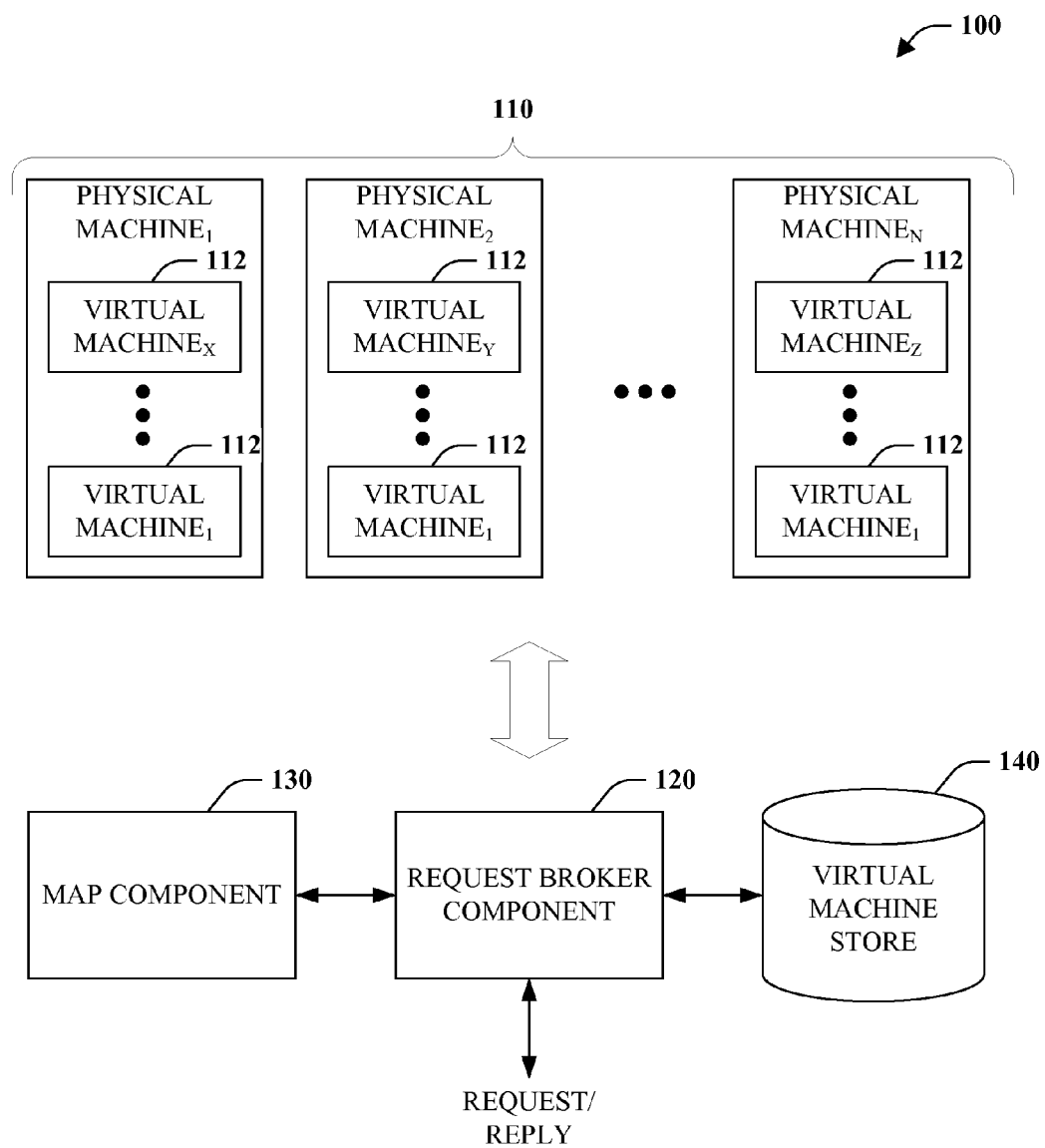
FIG. 1 is a block diagram of a system that facilitates hardware utilization.

In a client-server computing model, it is desirous to maximize utilization of physical server hardware. Conventionally, this is accomplished utilizing virtual machine technology where a number of virtual servers can be run in isolation on top of a single physical server. In other words, tenants can be provided with a virtual machine on which they can run a server application such as a web server. However, there are a number of drawbacks of this approach. First, each virtual machine has a large footprint in terms of the amount of resources it requires. As a result, approximately two-dozen virtual machines, such as virtual servers, can be running on a single physical machine. Further, resource utilization of physical hardware is affected. For example, central processing unit (CPU) utilization may be very low because the cumulative load from virtual servers is small, but in order to keep all virtual machines running the physical resources need to be allocated.

To address this issue, hibernation can be considered. Here, a virtual machine can be written to a persistent store, shut down, and removed from memory. At some future point in time, the virtual machine can be read from the store, brought back into memory, and restarted. In this manner, a larger number of virtual machines can be supported by a single physical machine than is otherwise possible. In this case, virtual machines can be housed in a store and when a request comes in a corresponding virtual machine can be read from a store, put into memory, and started. The downside of performing such hibernation with a conventional virtual machine is that it would take approximately a minute for a virtual machine to be read from or written to a store. Where the virtual machine implements a server, such as a web server, that means it would take over a minute to acquire a response. Moreover, if there is no space, a virtual machine would have to be shut down and another virtual machine started introducing a two-minute delay. This latency is unacceptable. For example, it is unlikely that a user would be willing to wait a minute or two for a webpage to be loaded.

Details below are generally directed toward lightweight on-demand virtual machines. Applications can be packaged with, or otherwise linked to, a library operating system rather than a conventional full-fledged operating system, thereby reducing the resource footprint. As a result, rather than being limited to two-dozen virtual machines, hundreds of virtual machines can be running at the same time. Furthermore, when employed in conjunction with hibernation techniques, thousands of virtual machines can be supported by a single physical machine. Moreover, hibernation can be performed expeditiously such than any added latency is substantially imperceptible to an end-user.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, a system 100 that facilitates hardware utilization is illustrated. The system 100 includes one or more physical machines 110 (PHYSICAL MACHINE$_1$-PHYSICAL MACHINE$_N$, where "N" is an integer greater than or equal to one). These physical machines 110 correspond to computers including hardware (e.g., CPU, memory, storage . . . ) and software (e.g., operating system) computational resources. Each physical machine 110 can include zero or more virtual machines 112 (VIRTUAL MACHINE$_1$-VIRTUAL MACHINE$_{X, Y, Z}$, where "X," "Y," and "Z" are integers greater than or equal to zero). The virtual machines 112 are software implementations of machines that appear to other programs, or clients, as physical machines. For example, a virtual machine 112 can correspond to a virtual server such as a virtual web server or database server. Moreover, the virtual machines 112 are lightweight in stark contrast to conventional virtual machines that include large resource overheads in terms of disk, memory, and CPU. In accordance with one embodiment, a library operating system can be substituted for a full-fledged, or full-featured, operating system utilized by conventional virtual machines.

With conventional virtual machines there is a significant redundancy related to virtual hardware. For example, a conventional virtual machine creates a virtual network interface card (NIC), a virtual hard disk, a virtual controller, a virtual CPU, and other resources. On top of the hardware virtualization layer there is an operating system kernel that runs inside the guest operating system. A major role of the kernel and device drivers in the guest operating system is to create abstract resources such as threads, private virtual memory, and network sockets. A library operating system can enable elimination of those two redundant layers. More specifically, rather than employing layer of hardware virtualization and the layer above it of hardware abstraction, basic primitives can be utilized from a host operating system. For instance, thread and virtual memory primitives of a host operating system can be employed. Code concerning bookkeeping about hardware and its state is unused and is thus removed. In other words, a library operating system can reduce the amount of code to the minimum needed to run an application. By way of example, a library operating system may require 64 MB of storage space compared to 2-4 GB for a conventional full-featured operating system. In memory, the overhead can be 16 MB of virtual memory working set compared to 128-512 MB of physical memory for conventional operating system. The smaller size makes it much faster to save to disk and send across a network than a conventional operating system.

A library operating system can be generated by refactoring a conventional operating system in a particular manner. More specifically, in one instance, application services (e.g., frameworks, rendering engines, common user interface controls, language runtimes . . . ) can be packaged in a library operating system and user services (e.g., graphical window manager, clipboard, search indexers . . . ) and hardware services (e.g., OS kernel, device drivers, file systems . . . ) are packaged with a host operating system. In one instance, a library operating system can be produced that is $\frac{1}{50}^{th}$ the size of the full operating system. This library operating system is distinct from previous library operating systems designs, which aimed to provide application customized performance enhancement by exposing low-level hardware abstractions to applications. These previous designs provide applications with fine-grained, customized control of hardware resources such as page tables, network packets, and disk blocks (e.g., Exokernel, Cache Kernel, and Nemesis). Here, the library operating system employed differs in its goals (security, host independence, and migration) and thus offers higher-level abstractions. These higher level-abstractions make it easier to share underlying host operating system resources such as buffer caches, file systems, and networking stacks with a library operating system.

Figure 2:
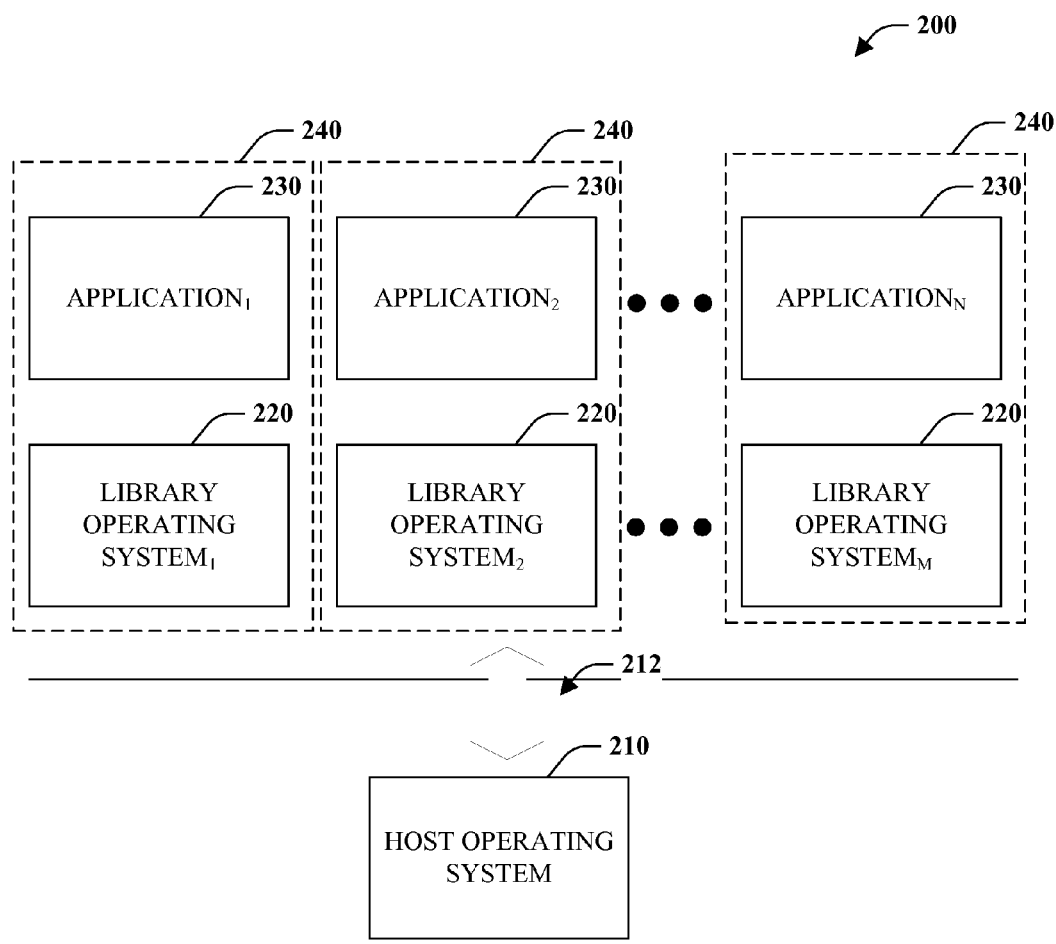
FIG. 2 is a block diagram of an exemplary library operating system architecture.

Turning attention to FIG. 2, an exemplary library-operating system architecture 200 is illustrated. As shown, the architecture 200 includes host operating system 210, which is the primary operating system installed on a computer. In most cases, the host operating system 210 is the only operating system. Here, however, several library operating systems 220 (LIBRARY OPERATING SYSTEM$_1$-LIBRARY OPERATING SYSTEM$_M$, where M is a positive integer) are guests that operate over, or within, the host operating system 210. A number of applications 230 (APPLICATION$_1$-APPLICATION$_N$, where N is a positive integer) are executed over compatible library operating systems 220. Each of the plurality of library operating systems 220 captures the personality (e.g., application programming interfaces and applications semantics, upon which applications are built) of an operating system on which an application depends and can run in the application's address space as a library. Accordingly, a library operating system can encapsulate portions of an operating system most likely to break application compatibility (e.g., application services).

The architecture 200 resembles a conventional virtual-machine architecture, but rather than employing an entire operating system, a library operating system is employed. Resource overhead is thus dramatically reduced. For example rather than consuming 512 MB of random access memory (RAM) and 4 GB of disk space to run an entirely separate copy of an operating system, less than 16 MB of RAM and 64 MB of disk space can be consumed by a library operating system. In practice, a typical consumer device may only be able to run one or two copies of entire conventional operating system, which makes it difficult to run many different applications. However, by substituting a library operating system of a conventional operating system many different applications requiring various versions of an operating system are supported quite easily.

In accordance with one embodiment, each combination of an application 230 and a library operating system 220 can operate within, a virtual environment 240, called a picoprocess, which is lightweight, state isolation container built from an operating system process address space, but without access to the full services of a host operating system 210. In other words, applications can be sandboxed such that an ill-behaved application cannot compromise other applications or its host. Code running in the picoprocess can employ an interface 212 (e.g., application binary interface (ABI)) with the host operating system 210 represented by the arrow in FIG. 2 following design patterns of conventional hardware virtual machines. Interface calls can be serviced by a security monitor component (not shown) of the host operating system 210, which can be similar in function to a hypervisor or virtual machine monitor with respect to conventional hardware virtual machines.

In one particular embodiment, the interface 212 can be implemented by a platform adaptation layer (not shown) within a virtual environment 240 and a security monitor (not shown) within the host operating system. The interface enables virtualization of host operating system resources into an application while maintaining a security isolation boundary between a library operating system 220 and host operating system 210. Although implementations of a platform adaptation layer and security monitor, for example, may vary, compatibility is maintained by adherence to an application binary interface contract. Stated differently, a consistent set of abstractions can be maintained across varying host operating system implementations, for instance. Accordingly, applications can be executed with respect to different instruction set architectures and different physical machine platforms.

In sum, the virtual machines described are different from conventional virtual machines in that they are lightweight, meaning they dramatically reduce resource overhead. Nevertheless, the virtual machines still include three compelling qualities of conventional virtual machines, namely secure isolation, persistent compatibility and execution continuity. Secure isolation refers to the ability to isolate application such that an ill-behaved application cannot compromise other applications or the host operating system. Persistent compatibility concerns allowing a host operating system and an application to evolve separately such that a change in a host does not break applications (e.g., fail, fail to operate as intended . . . ). Execution continuity pertains to allowing applications to be free of ties to a specific host computer so that an application can be moved from computer to computer across space and time within a single run. As well, such lightweight virtual machines follow design patterns of conventional virtual machines, for example with respect to interfacing between an isolated execution space and a host operating system.

Returning to FIG. 1, lightweight virtual machines 112 (or simply virtual machines 112) can improve the packing density of virtual machines significantly. For example rather than being limited to about two-dozen conventional virtual machines, a couple hundred lightweight virtual machines can be running at the same time. Employment of hibernation techniques can further increase the number of virtual machines that can be run on a physical machine from hundreds to thousands by swapping virtual machines on and off the physical machine as needed. This is particularly beneficial for applications with low central processing unit (CPU) utilization, such as cloud/web applications with low traffic. Moreover, the lightweight nature of the subject virtual machines can allow hibernation to be performed expeditiously.

Request broker component 120 is configured to receive, retrieve, or otherwise obtain or acquire a request, for example from a program, and forward the request to a target virtual machine 112. A reply to the request can be supplied directly by a virtual machine 112 or indirectly by way of the request broker component 120. Map component 130 is configured to store information regarding at least which virtual machines are currently running and on which physical machine they are running. Accordingly, in one embodiment the map component can be a table or like data structure. The request broker component 120 can reference the map component 130 to determine where to route an incoming request. The virtual machine store 140 is a persistent computer-readable storage medium that can house a plurality of non-running virtual machines. Where the intended recipient of a request is a virtual machine that is not currently running, the request broker component 120 can be configured to locate and read the virtual machine from the virtual machine store 140 and at least initiate loading and starting the virtual machine a physical machine 110. Subsequently, the request can be forwarded to the running virtual machine 112 and the map component can be updated to reflect this fact. Further, if the physical machines 110 do not have the capacity to support addition of another virtual machine 112, the request broker component 120 can at least initiate removal of a virtual machine 112 to make computational resources available for a virtual machine to be added. Further yet, the removed virtual machine can be added to the virtual machine store 140 and later retrieved if needed to service a request. In other words, a virtual machine can be added on-demand. Still further yet, the state of the removed virtual machine can be saved such that if it is later loaded to a physical machine 110 processing can resume where it left off.

By way of example, consider a shopping cart web application. A shopping cart builds up state held internally as a user adds items to the shopping cart. A particular customer's shopping cart may go idle meaning the shopping cart has not needed to be updated for a few minutes or hours. There may be a situation where it is desirable to run another web application on a physical machine, but there is no available capacity. Since in the shopping cart application has gone it can be a candidate for eviction. In this case, unbeknownst to the shopping cart application it can be hibernated. More specifically, the memory content of the shopping cart application can be written out to persistent storage like a virtual server backing store sort of unhooking the application. The memory used by the shopping cart application can now be reclaimed and used to host some other application. At some future point, if a user returns and starts to interact with the shopping cart, perhaps a few hours later, upon receipt of a request it can be determined that the shopping cart has been serialized to disk. A location can then be identified and the shopping cart application can be rehydrated, or brought back to life, and reconnected to the incoming request without the application user or the application being aware of it.

Figure 3:
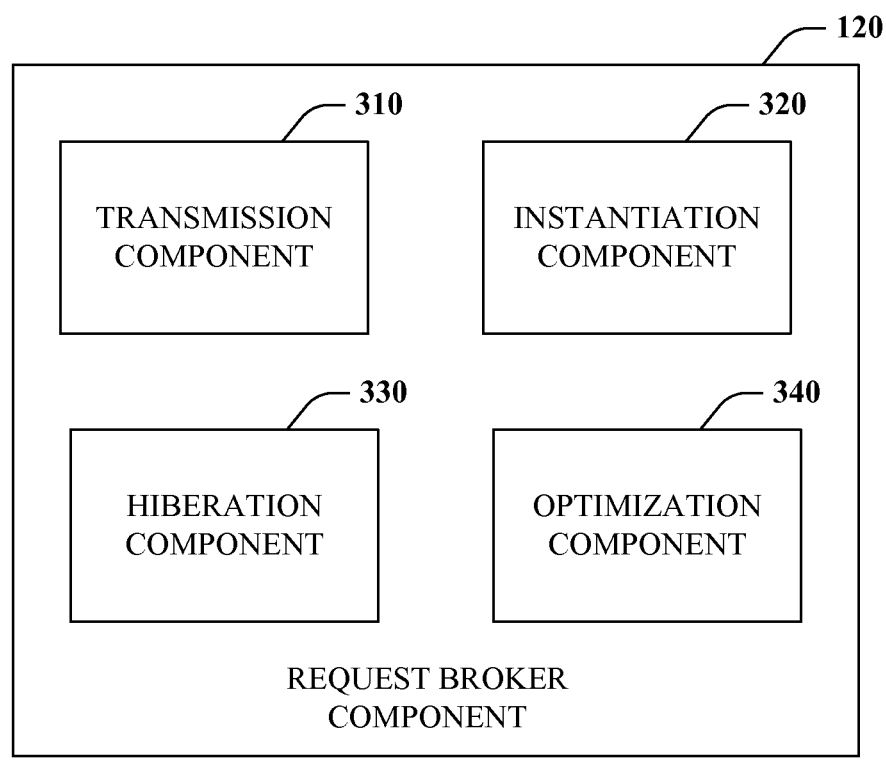
FIG. 3 is a block diagram of a representative request-broker component.

Turning attention to FIG. 3, the request broker component 120 is illustrated in further detail. Transmission component 310 is configured to enable transmission of requests to virtual machines, and optionally return replies to a requesting entity. Accordingly, upon receipt of a request the transmission component 310 can forward the request to the target, or intended recipient, after determining on which physical machine the target virtual machine is running, for example from the map component.

Instantiation component 320 is configured to at least initiate instantiation of a virtual machine 112 on a physical machine 110. Instantiation can involve reading a virtual machine, or image of a virtual machine, from a persistent store such as the virtual machine store 140 of FIG. 1, loading the virtual machine on a physical machine, and starting execution. In other words, the virtual machine is rehydrated on the physical store. As noted above, virtual machine state can be persisted as well such that upon loading or rehydration, the virtual machine can resume execution from a point it previously stopped.

Hibernation component 330 is configured to at least initiate removal of a virtual machine from a physical machine. Removal can involve terminating execution of a running machine and saving the virtual machine to a persistent store. Such hibernation can also be referred to herein as dehydration, dehydrating a virtual machine or the like. Additionally, the state of a virtual machine can be saved as well to enable subsequent resumption of execution. In accordance with one embodiment, an image or snapshot (e.g., replica of contents) of a virtual machine can encapsulate state. As a result, state need not be captured and saved to a separate persistent store. Rather, state is saved upon saving an image of a virtual machine. Accordingly, a virtual machine can support stateful applications. Moreover, developers need not take measures to enable such hibernation functionality and in fact can be unaware that virtual machine is being hibernated and subsequently resumed from hibernation.

Oversubscription of hardware can be employed when it is known that a solely a few virtual machines will be in use at a given time. Hibernation is a technique to make resources available by for instance hibernating or removing a virtual machine from a physical machine. The particular virtual machine that is removed or evicted can be governed by one or more policies implemented by the request broker and more specifically the hibernation component 330. Those of skill in the art will recognize that there many possible policies for evicting a virtual machine including, among others, based on a service-level agreement or least recently used. For example, a virtual machine that is idle for predetermined time can be identified as a candidate for eviction.

In accordance with one particular embodiment, the hibernation component 330 can write out some form of the image of a virtual machine and then all computational resources previously held by the virtual machine can be released. That includes all the memory the virtual machine was using and all the operating system resources that the virtual machine was using like access to the file system, open sockets, or other things exposed by an operating system. A hybrid approach is also contemplated. In other words, rather than releasing all computational resources held by a virtual machine subset of computational resources can be released. For example, memory can be released but not access to operating system resources or system resources can be released but not memory. There are a number of options depending upon the resource that is most constrained. Often memory is the most constrained resource, but is it could be network socket or something else. Regardless, the most constrained resource can be released and the rest of the resources can remain present to enable the virtual machine to resume from hibernation faster. Still further yet, rather that releasing resources compression techniques can be employed to add capacity.

Optimization component 340 is configured to optimize the placement of virtual machines on physical machines automatically. For example, during down time or between requests the optimization component can hibernate and/or instantiate various virtual machines based on one or more optimization policies as well as known or inferred information. For example, it can be predicted that a currently hibernating virtual machine will be needed shortly and thus can be instantiated to a particular physical server that results in faster response times than others. Additionally or alternatively, the optimization component 340 can optimize distribution of virtual machines across physical machines based on some factor. For example, the virtual machines can be redistributed across physical machines to balance workload across the physical machines. In another example, virtual machines can be consolidated onto a smaller number of physical machines so that other physical machines can be powered down, for instance to save on electricity costs. Those of skill in the art will recognize many other optimization techniques that can be employed by the optimization component 340 with respect to placement and distribution of virtual machines, all of which are within the scope of the claimed subject matter.

While the request broker is shown as a single component, the functionality thereof can also be embodied as a distributed service. For example, rather than having an explicit out-front request broker, a request could go to the last physical machine that included a target virtual machine. The physical machine could then determine if the virtual machine is present anymore, and if not, either instantiate the target virtual machine locally or query other physical machines as to whether they have capacity to add the target virtual server.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the request broker component 120 can employ such mechanism to determine or infer which virtual machines to hibernate and well as where to instantiate virtual machines, among other things.

Figure 4:
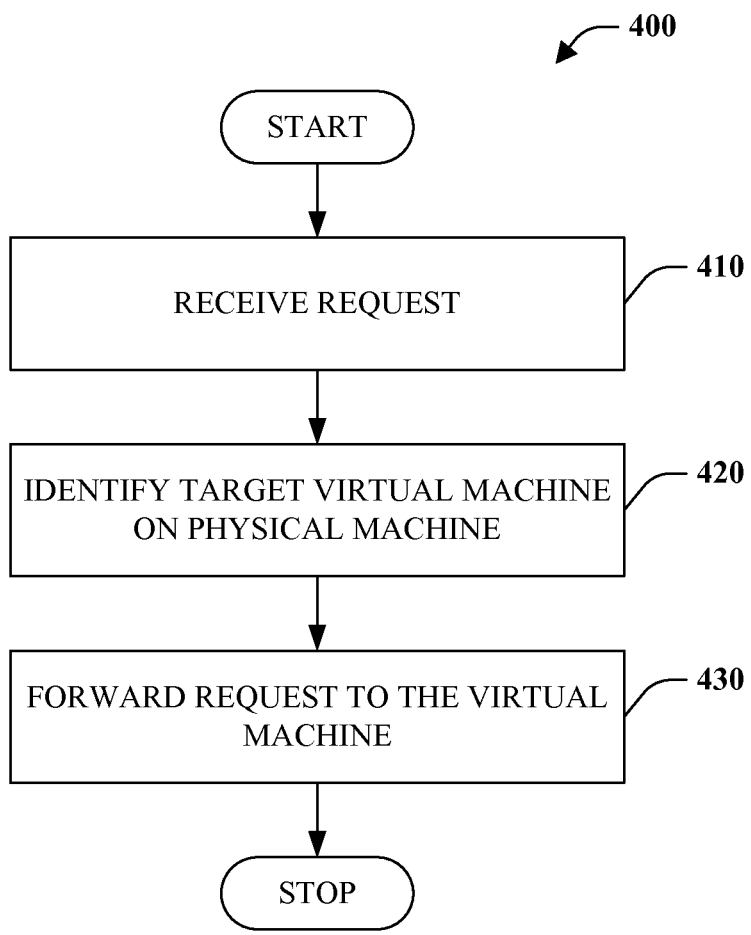
FIG. 4 is a flow chart diagram of a method of request brokering.
Figure 5:
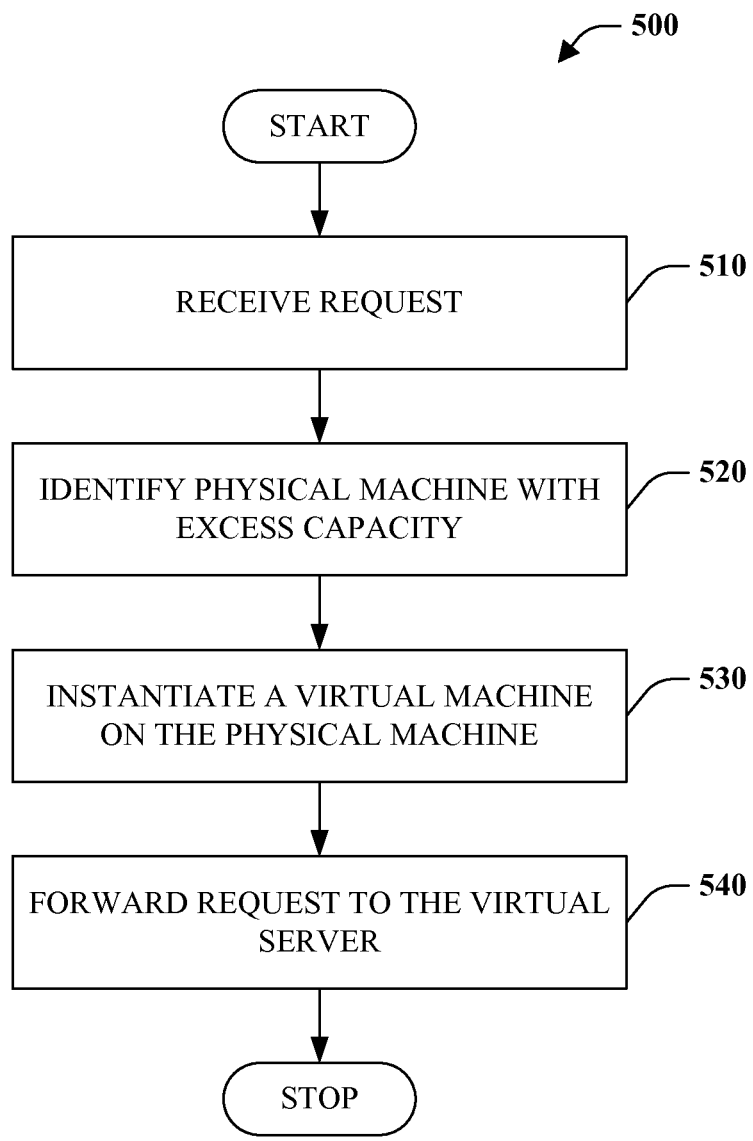
FIG. 5 is a flow chart diagram of a method of request brokering.
Figure 6:
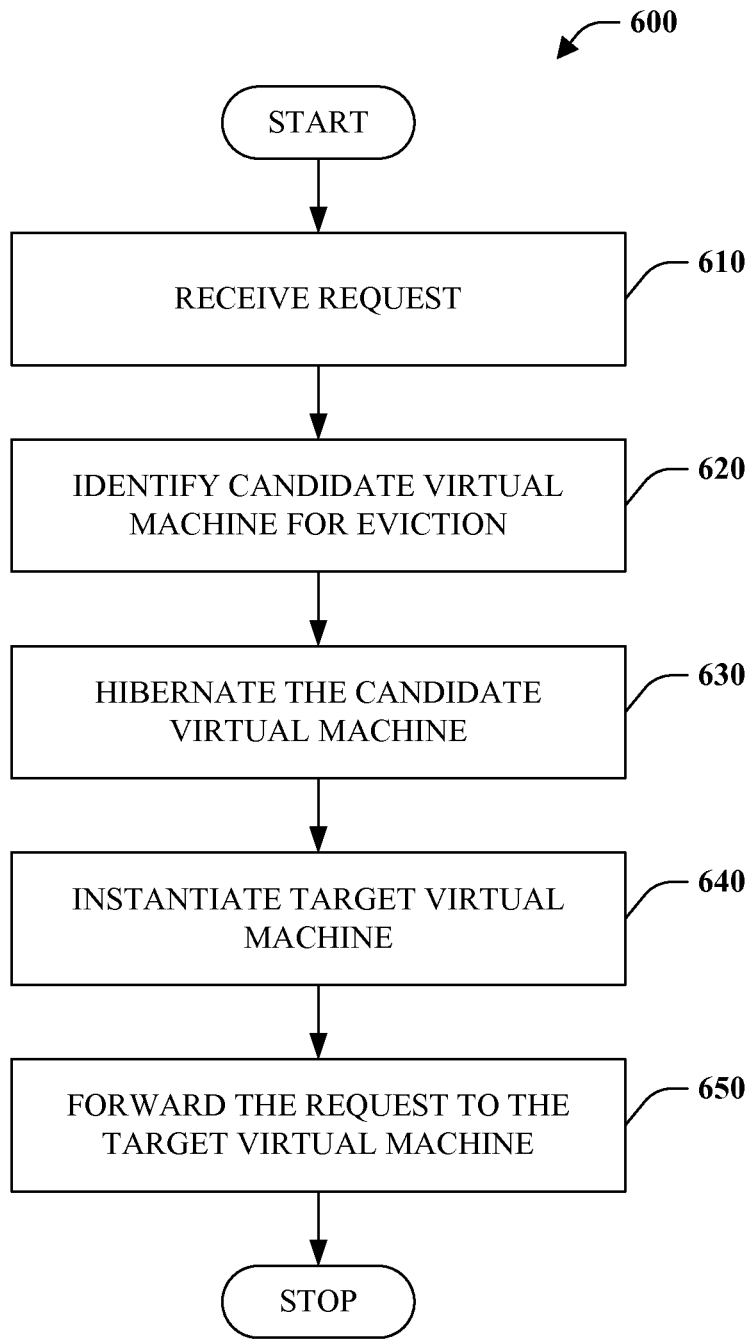
FIG. 6 is a flow chart diagram of a method of request brokering.

In view of the exemplary systems described supra, methodologies that may be implemented in accordance with the disclosed subject matter will be better appreciated with reference to the flow charts of FIGS. 4-6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 4, a method 400 of request brokering is illustrated. At reference numeral 410, a request is received, retrieved or otherwise obtained or acquired for service. At numeral 420, a target virtual machine (the intended recipient of the request) running on a physical machine is identified. For example, a map or table can consulted to locate the target virtual machine as a function of the request. At reference numeral, 430 the request is forwarded to the target virtual machine for servicing. For example, the virtual machine can correspond to a web server that receives requests for web pages and returns requested web pages in response.

FIG. 5 depicts a method 500 of request brokering. At reference numeral 510, a request is received, retrieved or otherwise obtained or acquired. At numeral 520, a physical machine with excess capacity is identified. At reference 530, a virtual machine is instantiated on the identified physical machine. Here, the virtual machine corresponds to the intended recipient, or target, of the request and instantiation pertains to loading a virtual machine on to a physical machine, for example by copying code and initiating execution. Where a lightweight virtual machine is employed comprising a library operating system, instantiation can be substantially fast (e.g., <1 second) such that there is no noticeable latency introduced. At reference numeral 540, the request is forwarded to the newly instantiated virtual machine for servicing.

FIG. 6 illustrates a method 600 of request brokering. At reference numeral 610, a request is received, retrieved, or otherwise obtained or acquired. At numeral 620, a candidate virtual machine is identified for eviction. Various policies can be employed to identify the candidate include service-level agreement or least recently used, among others. At reference 630, the identified candidate virtual machine is hibernated or in other words dehydrated. For example, execution of the candidate virtual machine is terminated and a snapshot, or image, of the virtual machine is saved to a persistent store. At reference 640, a target virtual machine is instantiated on a physical machine. For instance, a virtual machine image can be acquired, loaded on a physical machine and execution initiated. In other words, the target virtual machine can be resumed from hibernation or rehydrated. Utilizing lightweight virtual machines, as described herein, it is possible to hibernate the candidate virtual machine in under one second and instantiate the target virtual machine in under one second resulting in a total latency of less than two seconds, which can be imperceptible to an end-user. At reference numeral 650, the request is forwarded to the target virtual machine.

As used herein, the terms "component," "system," "architecture," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

The conjunction "or" as used this description and appended claims in is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'A' and 'B,'" then "'A' employs 'X' or 'Y'" is satisfied under any of the foregoing instances.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 7:
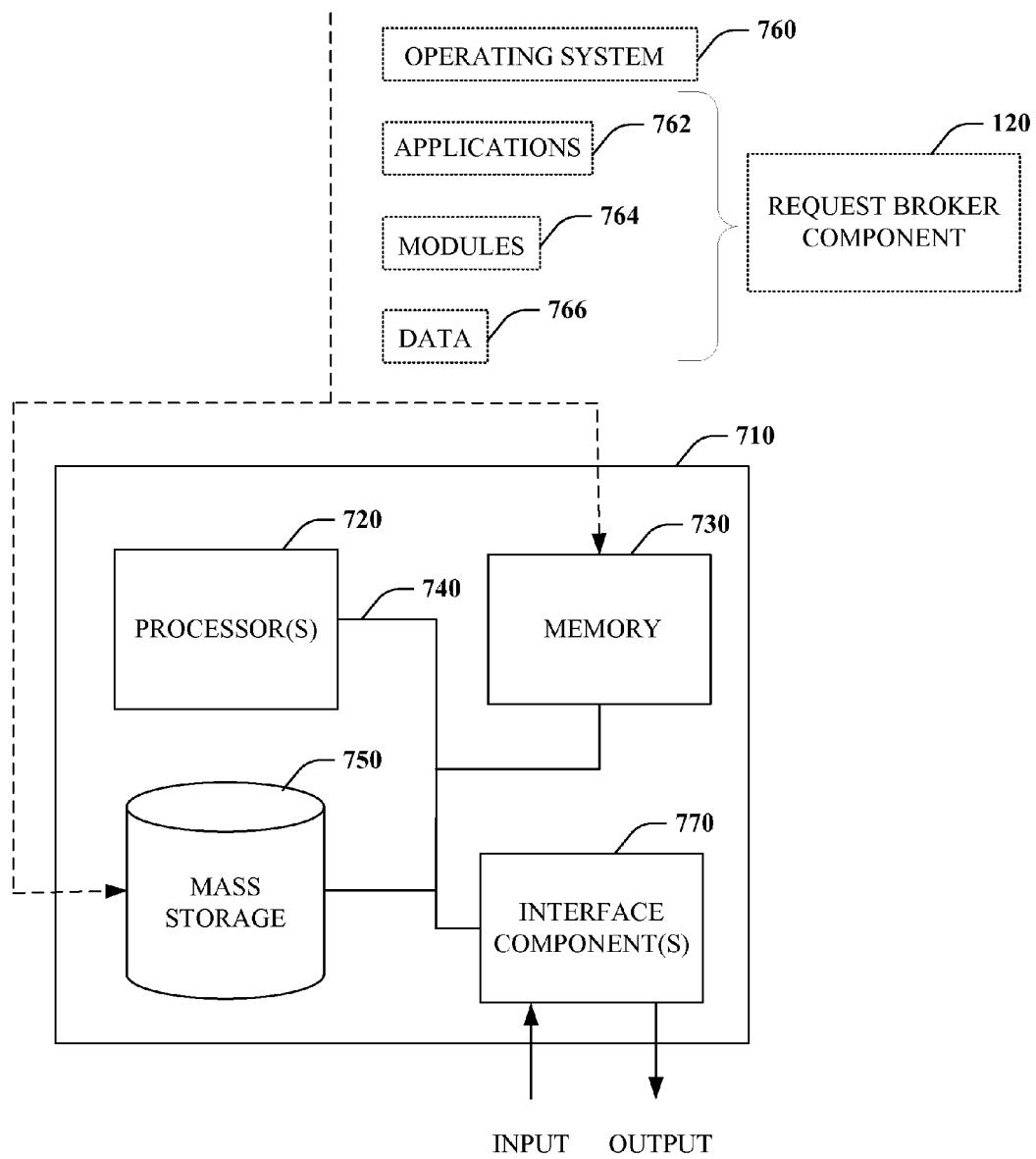
FIG. 7 is a schematic block diagram illustrating a suitable operating environment for aspects of the subject disclosure.

In order to provide a context for the claimed subject matter, FIG. 7 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, handheld computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 7, illustrated is an example general-purpose computer 710 or computing device (e.g., desktop, laptop, server, hand-held, programmable consumer or industrial electronics, set-top box, game system . . . ). The computer 710 includes one or more processor(s) 720, memory 730, system bus 740, mass storage 750, and one or more interface components 770. The system bus 740 communicatively couples at least the above system components. However, it is to be appreciated that in its simplest form the computer 710 can include one or more processors 720 coupled to memory 730 that execute various computer executable actions, instructions, and or components stored in memory 730.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration.

The computer 710 can include or otherwise interact with a variety of computer-readable media to facilitate control of the computer 710 to implement one or more aspects of the claimed subject matter. The computer-readable media can be any available media that can be accessed by the computer 710 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 710.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 730 and mass storage 750 are examples of computer-readable storage media. Depending on the exact configuration and type of computing device, memory 730 may be volatile (e.g., RAM), non-volatile (e.g., ROM, flash memory . . . ) or some combination of the two. By way of example, the basic input/output system (BIOS), including basic routines to transfer information between elements within the computer 710, such as during start-up, can be stored in nonvolatile memory, while volatile memory can act as external cache memory to facilitate processing by the processor(s) 720, among other things.

Mass storage 750 includes removable/non-removable, volatile/non-volatile computer storage media for storage of large amounts of data relative to the memory 730. For example, mass storage 750 includes, but is not limited to, one or more devices such as a magnetic or optical disk drive, floppy disk drive, flash memory, solid-state drive, or memory stick.

Memory 730 and mass storage 750 can include, or have stored therein, operating system 760, one or more applications 762, one or more program modules 764, and data 766. The operating system 760 acts to control and allocate resources of the computer 710. Here, the operating system 760 can correspond to a host operating system 210 able to support a number of library operating systems 220. Applications 762 include one or both of system and application software and can exploit management of resources by the operating system 760 through program modules 764 and data 766 stored in memory 730 and/or mass storage 750 to perform one or more actions. Accordingly, applications 762 can turn a general-purpose computer 710 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the request broker component 120, or portions thereof, can be, or form part, of an application 762, and include one or more modules 764 and data 766 stored in memory and/or mass storage 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the request broker component 120 and/or associated functionality can be embedded within hardware in a SOC architecture.

The computer 710 also includes one or more interface components 770 that are communicatively coupled to the system bus 740 and facilitate interaction with the computer 710. By way of example, the interface component 770 can be a port (e.g., serial, parallel, PCMCIA, USB, FireWire . . . ) or an interface card (e.g., sound, video . . . ) or the like. In one example implementation, the interface component 770 can be embodied as a user input/output interface to enable a user to enter commands and information into the computer 710 through one or more input devices (e.g., pointing device such as a mouse, trackball, stylus, touch pad, keyboard, microphone, joystick, game pad, satellite dish, scanner, camera, other computer . . . ). In another example implementation, the interface component 770 can be embodied as an output peripheral interface to supply output to displays (e.g., CRT, LCD, plasma . . . ), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method, comprising:
    employing at least one processor configured to execute computer-executable instructions stored in memory to perform the following acts:
        receiving a request; and
        in response to the request, resuming a first virtual machine from hibernation by instantiating the first virtual machine on a physical machine, wherein the virtual machine is executed in a container within a host operating system address space, and wherein the container contains an application, a guest operating system configured to run as a library that accesses hardware services provided by the host operating system, the hardware services provided by the host operating system to the guest operating system including an operating system kernel, at least one device driver, and file system services, wherein the guest operating system includes application services, including at least two of a framework, a rendering engine, a common user interface control, or a language runtime, and an interface between the guest operating system and the host operating system for accessing the hardware services, and wherein the interface exposes a set of abstractions of hardware, threads, and virtual memory, that are provided by the host operating system to the application, and the interface restricts direct control over the hardware by the application.

2. The method of claim 1, further comprising:
forwarding the request to the virtual machine.

3. The method of claim 1, further comprising:
in response to the request, hibernating a second virtual machine, wherein the second virtual machine comprises a second library operating system and a second application, by saving state of the second virtual machine, and releasing computational resources assigned to the second virtual machine, and wherein the resuming of the first virtual machine is also in response to the hibernating of the second virtual machine.

4. The method of claim 3, wherein the hibernating the second virtual machine is performed prior to resuming the first virtual machine from hibernation.

5. The method of claim 3, further comprising:
in response to the request, identifying the second virtual machine as a candidate for hibernation based on one or more policies, wherein the hibernating of the second virtual machine is also in response to the identifying of the second virtual machine as the candidate for hibernation.

6. The method of claim 3, wherein releasing computational resources assigned to the second virtual machine comprises:
releasing a subset of the computational resources employed by the second virtual machine.

7. The method of claim 3, wherein saving the state comprises:
saving a difference between a current state and a default state.

8. The method of claim 1, further comprising:
retrieving the first virtual machine from a virtual machine store.

9. A system, comprising:
a processor coupled to a memory, the processor configured to execute computer-executable instructions stored in the memory for causing the system to:
    forward a request to a first virtual machine that is to operate in a container within a host operating system address space, wherein the container is also to include an application, a guest operating system configured to run as a library operating system that accesses hardware services provided by the host operating system, the hardware services provided by the host operating system to the guest operating system including an operating system kernel, at least one device driver, and file system services, wherein the guest operating system comprises application services and an interface between the guest operating system and the host operating system, wherein the application services of the guest operating system include at least one of a rendering engine or a language runtime, and wherein the interface exposes a set of abstractions of hardware, threads, and virtual memory and restricts other control over the hardware by the first virtual machine; and add the first virtual machine to a physical machine, if the first virtual machine is not loaded on the physical machine.

10. The system of claim 9, wherein the instructions are also for causing the system to remove a second virtual machine from the physical machine.

11. The system of claim 10, wherein the instructions are also for causing the system to save a state of the first virtual machine.

12. The system of claim 9, wherein the instructions are also for causing the system to release a subset of computation resources employed by a second virtual machine for use by the first virtual machine.

13. The system of claim 9, wherein the instructions are also for causing the system to remove at least a second virtual machine from the physical machine based on a policy.

14. The system of claim 9, wherein the instructions are also for causing the system to rebalance load across multiple physical machines.

15. The system of claim 9, wherein the first virtual machine is a web server.

16. The system of claim 9, wherein the application is a web application.

17. A computer-readable storage medium, having instructions stored thereon that, when executed by a computer system, perform a method comprising:

determining whether a target virtual machine is instantiated on a physical machine in response to a request, wherein the target virtual machine is operated in a container within a host operating system address space, and wherein the container contains:

an application, a guest operating system configured to run as a library operating system that accesses hardware services provided by the host operating system, the hardware services provided by the host operating system to the guest operating system including an operating system kernel, at least one device driver, and file system services, wherein the guest operating system includes application services, the application services of the guest operating system including at least one of a rendering engine or a language runtime, and an interface between the guest operating system and the host operating system, wherein the interface exposes abstractions of the hardware services provided by the host operating system to the guest operating system, and wherein the target virtual machine is restricted from direct control over hardware of the physical machine;

instantiating the target virtual machine, if the target virtual machine is not presently instantiated on the physical machine; and forwarding the request to the target virtual machine.

18. The computer-readable storage medium of claim 17, wherein the method further comprises terminating, saving state, and releasing computational resources associated with a non-target virtual machine.

19. The computer-readable storage medium of claim 18, wherein the method further comprises instantiating the target virtual machine after terminating, saving state, and the releasing computational resources associated with the non-target virtual machine.

20. The computer-readable storage medium of claim 17, wherein instantiating the target virtual machine further comprises resuming execution from hibernation.

* * * * *